United States Patent
Nguyen

(10) Patent No.: US 6,793,399 B1
(45) Date of Patent: Sep. 21, 2004

(54) SYSTEM AND METHOD FOR OPTICAL PORT INSPECTION FOR TELECOMMUNICATION SYSTEMS AND DEVICES

(75) Inventor: Dung H. Nguyen, Houston, TX (US)

(73) Assignee: MCI, Inc., Ashburn, VA (US)

( * ) Notice: Subject to any disclaimer, the term of this patent is extended or adjusted under 35 U.S.C. 154(b) by 297 days.

(21) Appl. No.: 09/972,120

(22) Filed: Oct. 5, 2001

(51) Int. Cl.[7] ................................................. G02B 6/36
(52) U.S. Cl. ........................... 385/53; 385/55; 385/117; 385/119; 356/241.1
(58) Field of Search ............................. 385/53, 55, 116, 385/117, 118, 119; 356/73.1, 244, 241.1; 600/117, 118, 178, 179, 181; 348/68, 69

(56) References Cited

U.S. PATENT DOCUMENTS

| | | | |
|---|---|---|---|
| 5,724,127 A | * | 3/1998 | Csipkes et al. ............ 356/73.1 |
| 6,178,285 B1 | * | 1/2001 | Csipkes et al. ............. 385/147 |
| 6,412,987 B1 | * | 7/2002 | Horwitz et al. ............... 385/56 |
| 6,466,366 B1 | * | 10/2002 | Dominique ................. 359/379 |

* cited by examiner

Primary Examiner—Hemang Sanghavi

(57) ABSTRACT

The present invention relates to a system and method for in situ inspection of optical ports for occlusions that might impede an optical signal. The present invention utilizes a mini-borescope of the type having a borescope insertion tube of less that two millimeters in diameter. The mini-borescope may utilize a video camera for capturing images of the target and adjustably magnifies the target image for display. In addition, one of a plurality of component type borescope-to-optical port adapters is coupled to the mini-borescope insertion tube. Each particular type borescope-to-optical port adapter allows the insertion tube to be inserted and aligned to a corresponding type of optical component, for instance if the BOPA is an SC-type male connector, then the insertion tube will be readily accepted by an SC-type female adapter. Also included in the BOPA is a protective sleeve that surrounds a portion of the mini-borescope insertion tube. The protective sleeve provides the insertion tube with added rigidity, thereby lessening the likelihood of accidentally bending the tube during insertion. BOPAs may also cooperate with component shutter systems for actuating protective shutters during engagement of the BOPA, thereby exposing the coupling surface without manual intervention.

35 Claims, 12 Drawing Sheets

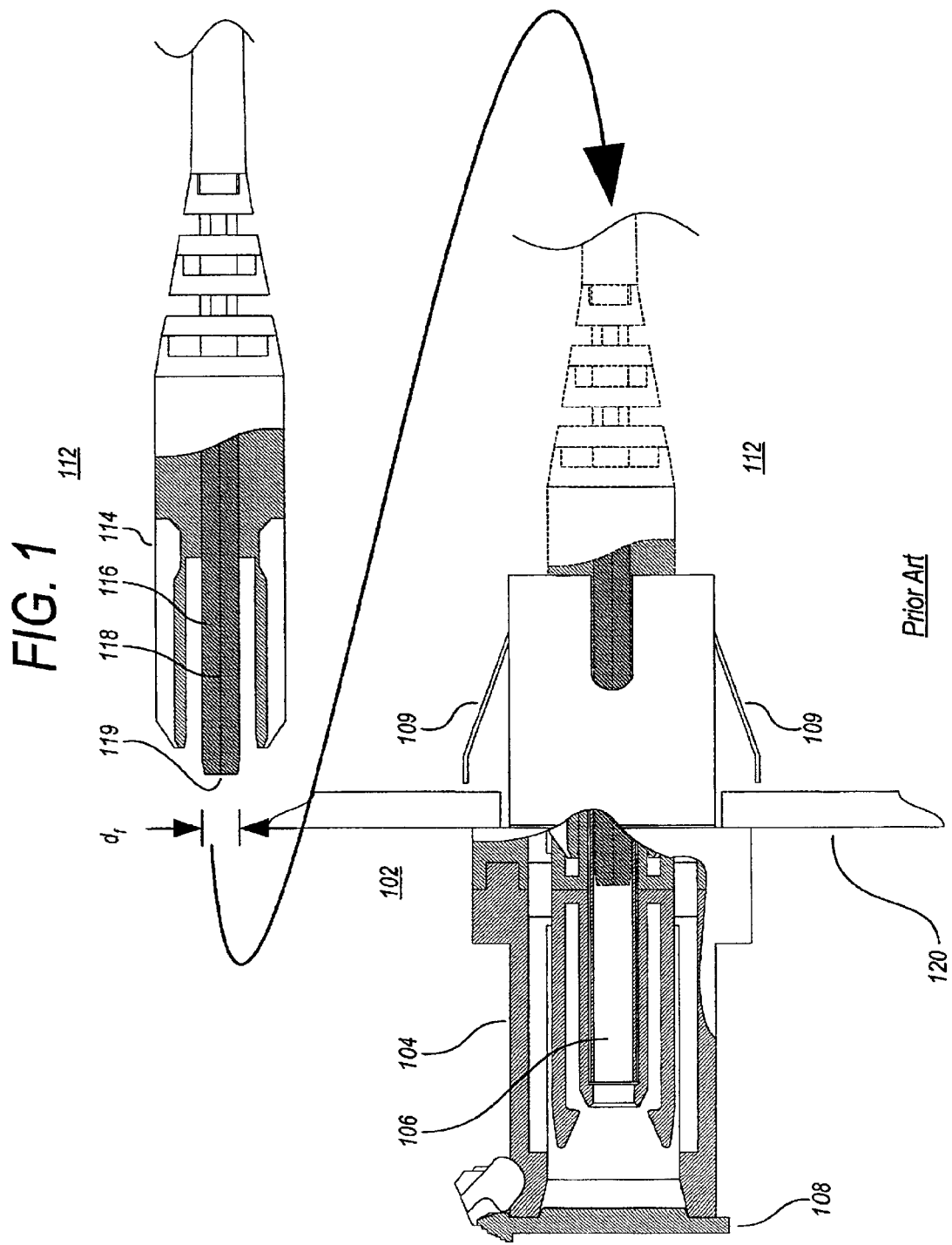

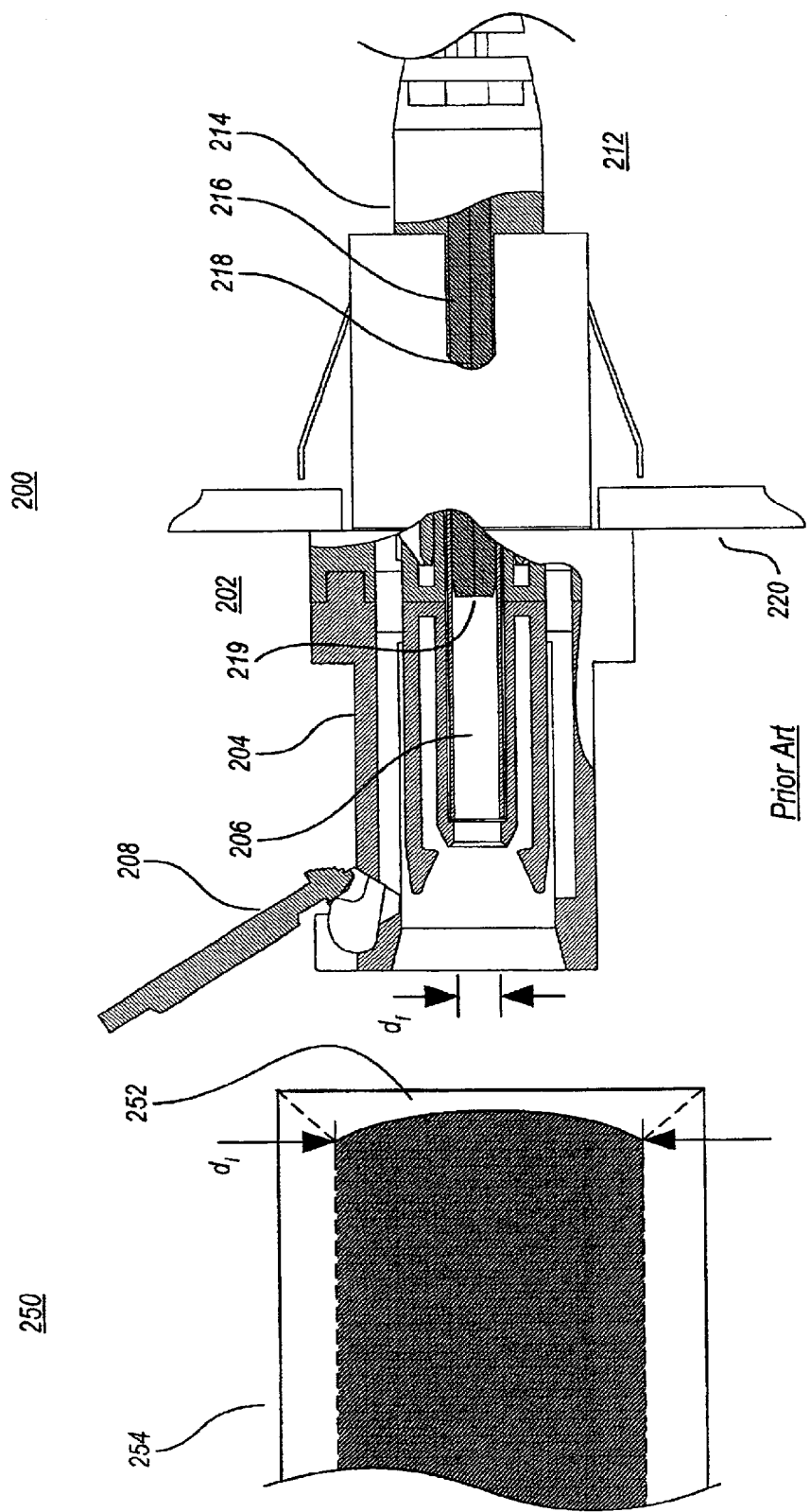

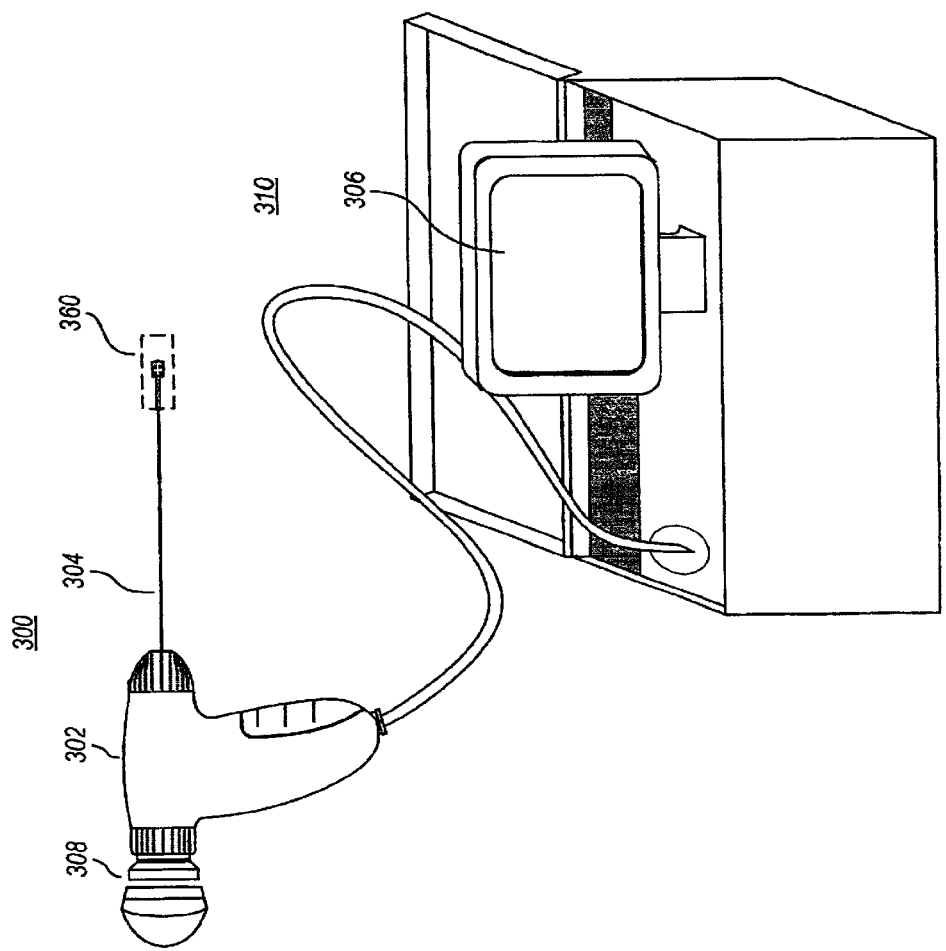

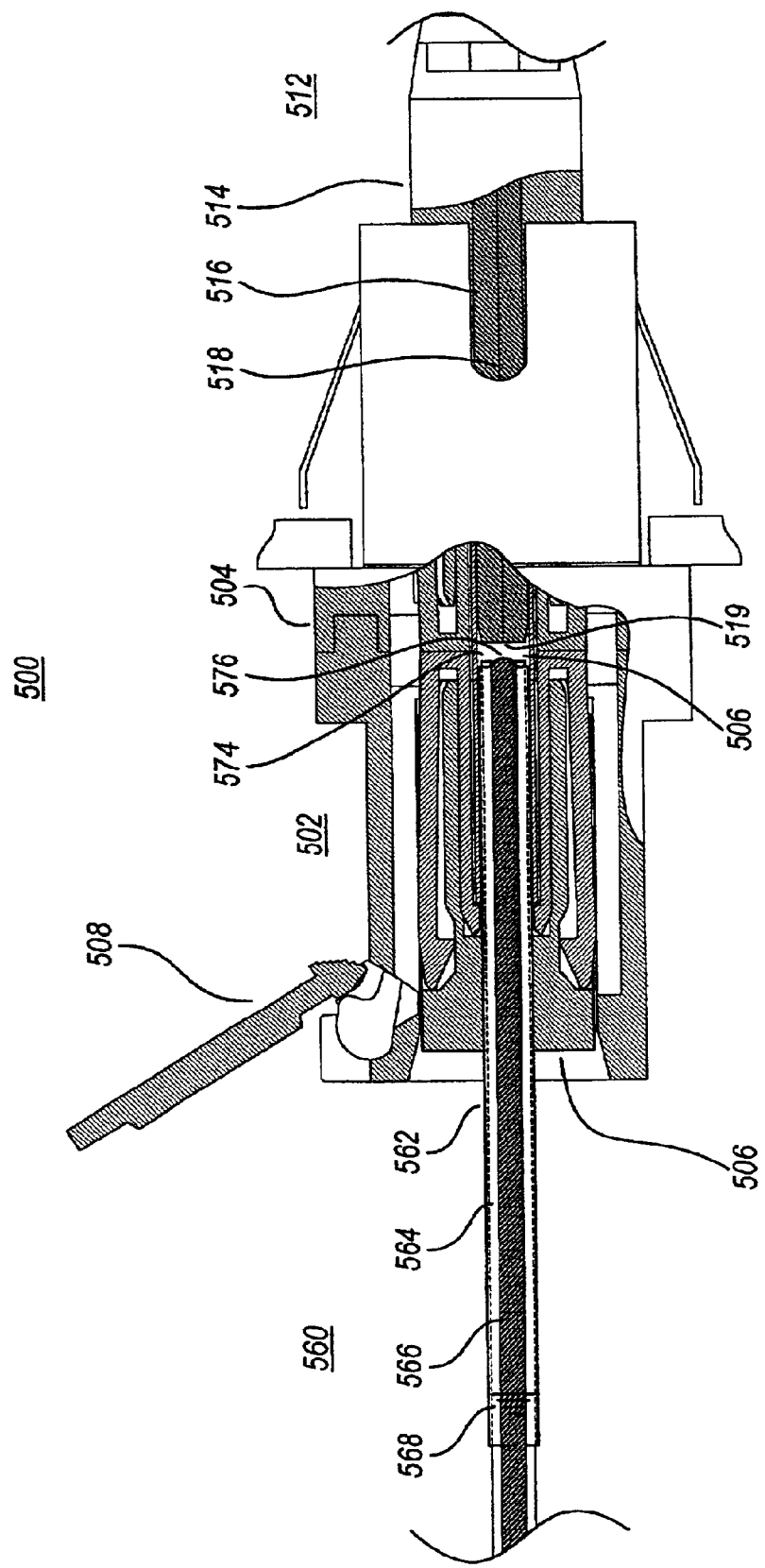

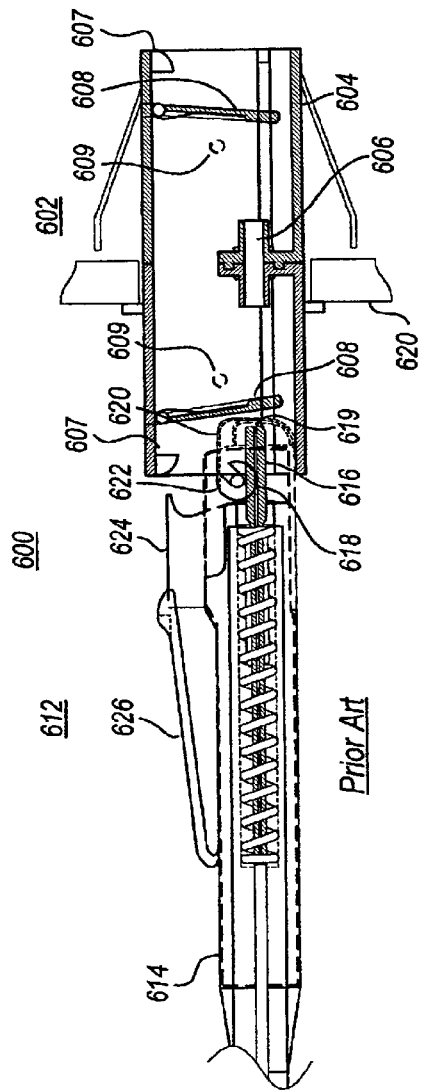
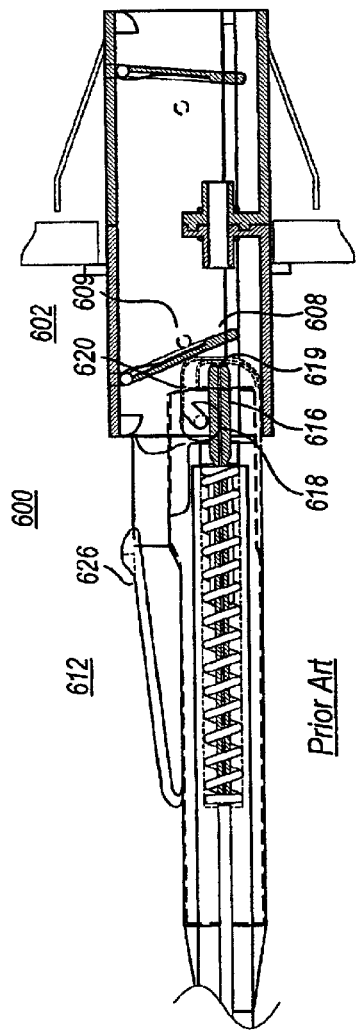
FIG. 6A
FIG. 6B
Prior Art

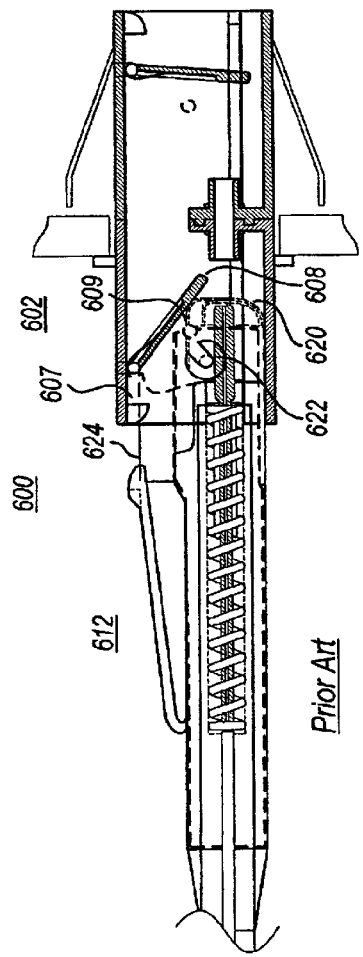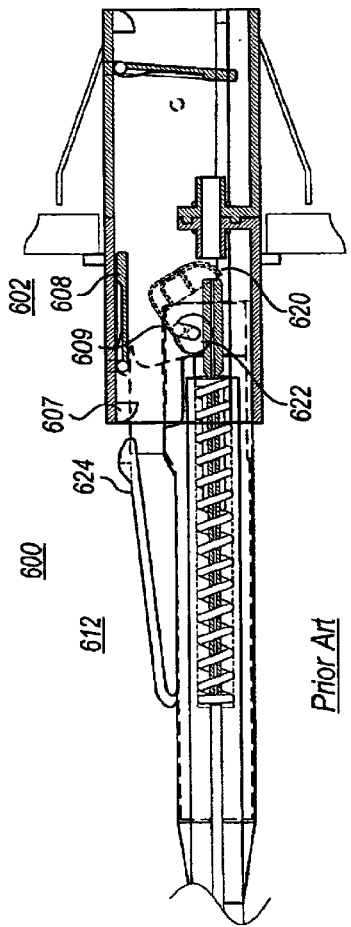
FIG. 6C *Prior Art*
FIG. 6D *Prior Art*

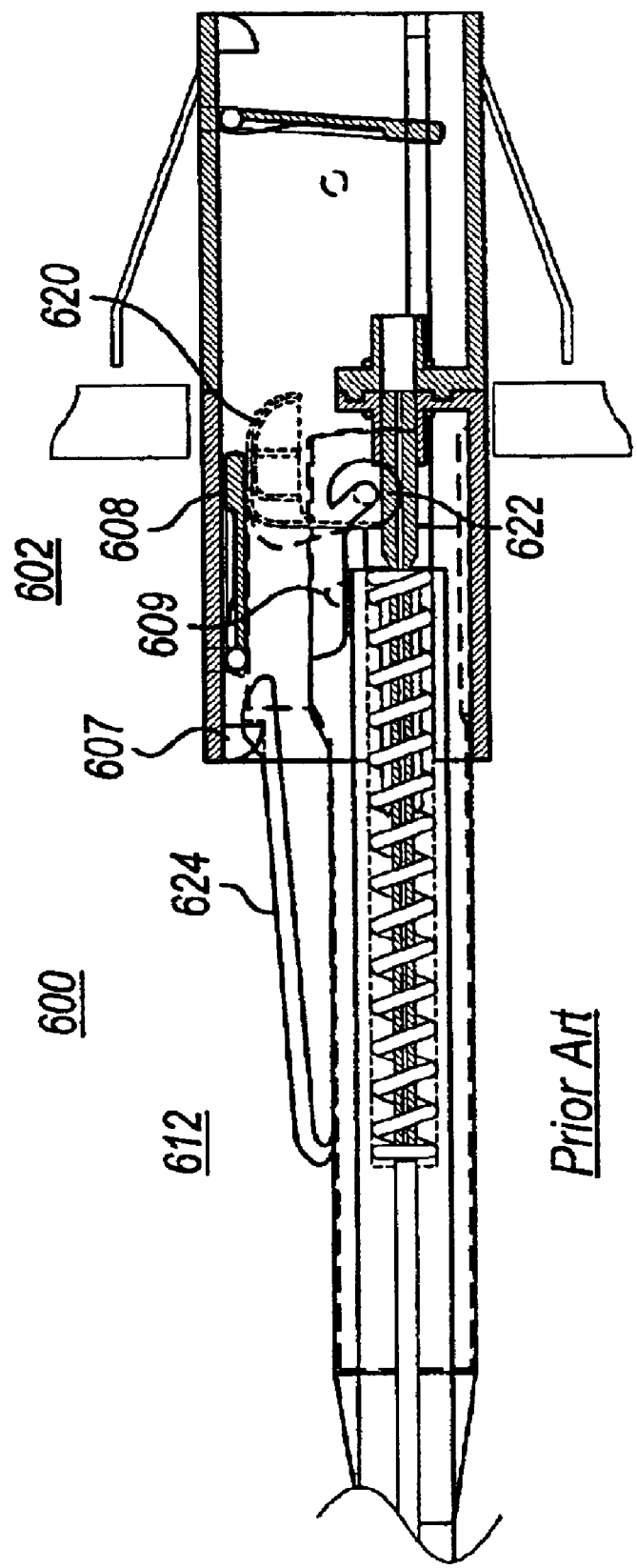

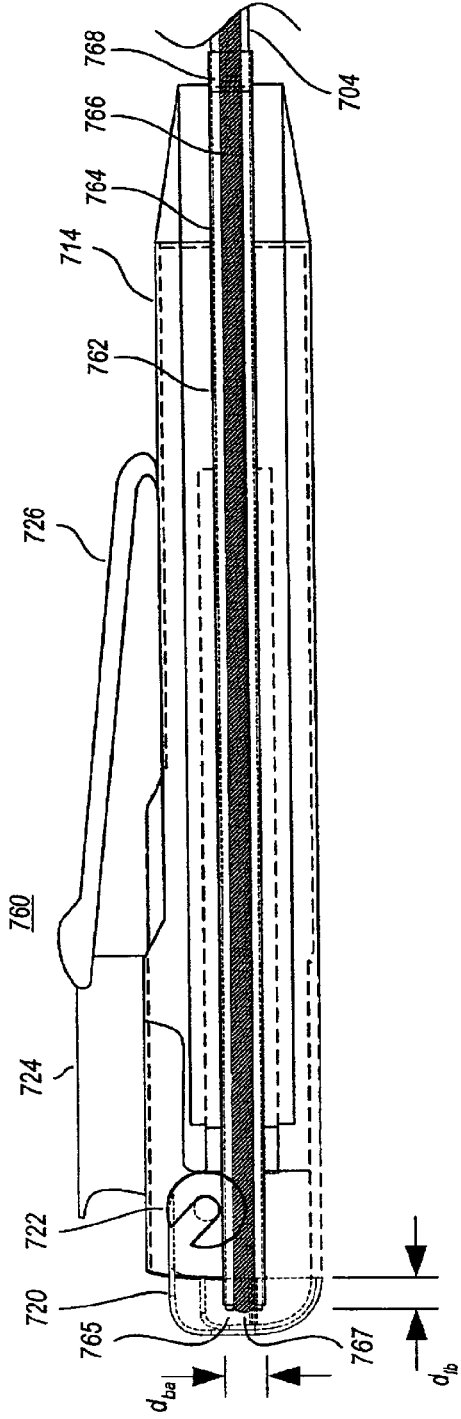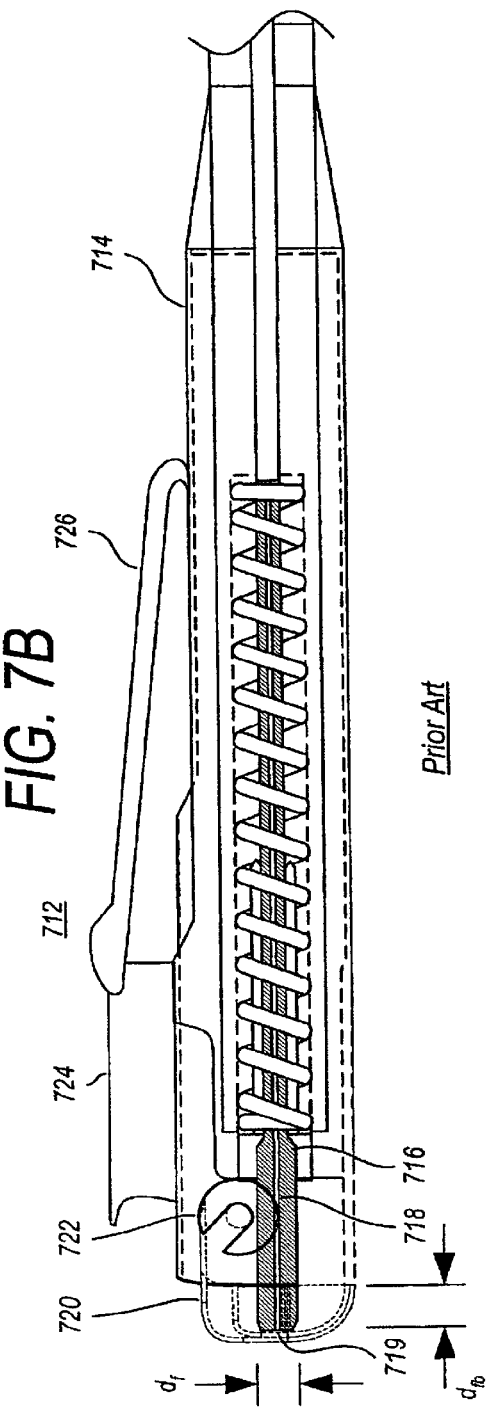
FIG. 7A
FIG. 7B Prior Art

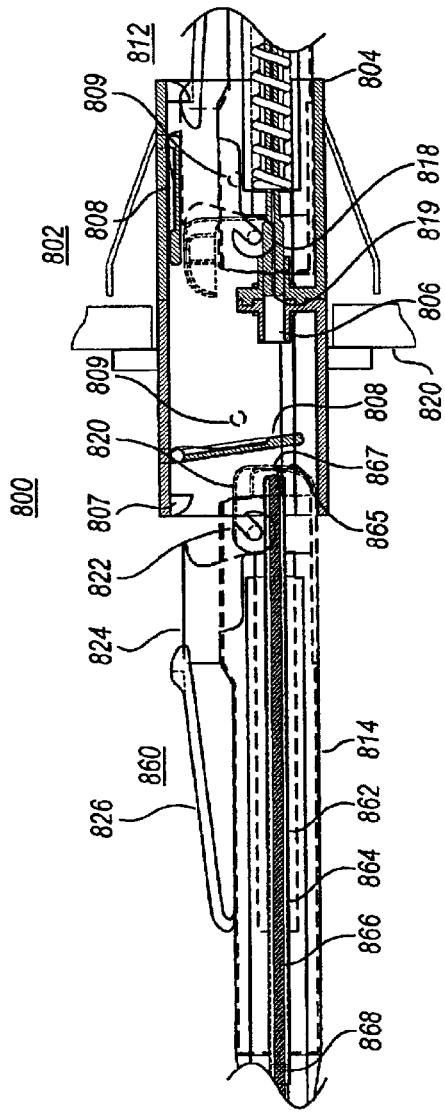
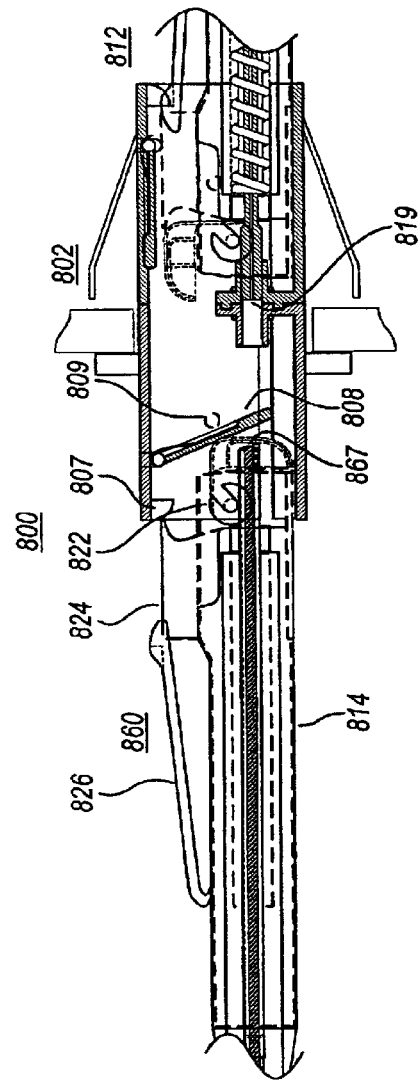

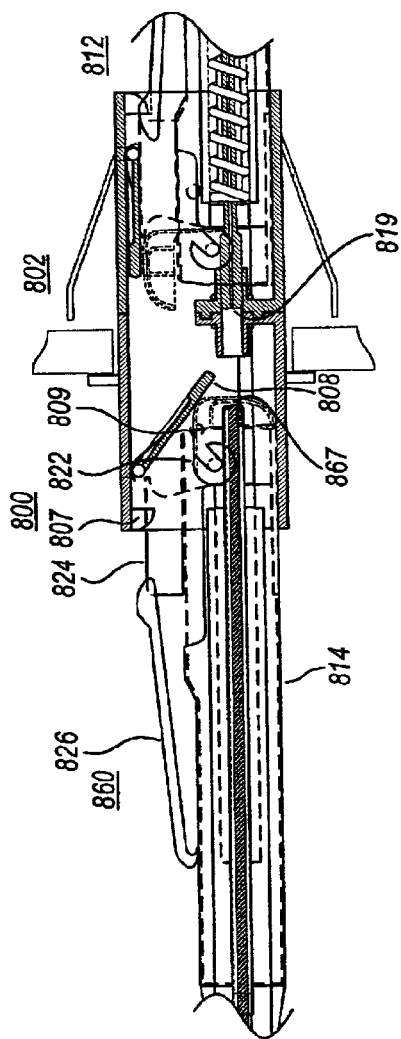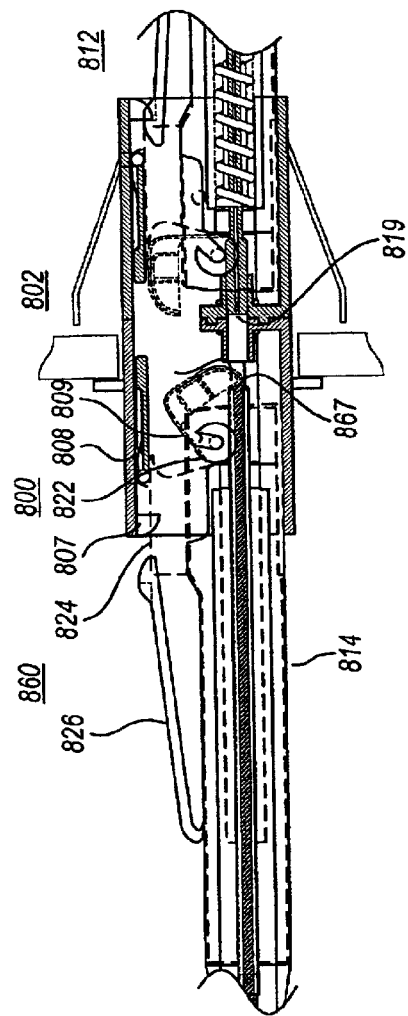

SYSTEM AND METHOD FOR OPTICAL PORT INSPECTION FOR TELECOMMUNICATION SYSTEMS AND DEVICES

BACKGROUND OF THE INVENTION

1. Field of the Invention

The present invention relates to optical ports and optical connection components used therein for optically coupling fibers such that an optical signal traverses the connection between the fibers. More particularly, the present invention relates to a system and method for inspecting optical ports for occlusions that might impede the optical signal.

2. Description of Related Art

As is known in the art, optical signals can be transmitted over optical fibers from location to location. Each optical fiber is optically connected or coupled to other fibers and/or optic processing equipment using optical components such as connector, adapters, optical ports and the like. At an optical connection, a pair of optical fibers transmits and receives optical signals across coupling surfaces formed at the termination end of the respective fibers. Optical connections have long been known as a primary source of signal degradation due to poor coupling characteristics such as misalignment of the optical axes, excessive spacing between coupling surfaces and contaminants which occlude or partially occlude the optical signal.

Normally, an optical connection takes the form of an adapter that engages a pair of optical connectors. The adapter, usually having a female-to-female connection, mates with the optical connectors, usually being a male connection. Each male optical connector secures the coupling surface of the fiber in a predetermined position and the adapter engages the optical connectors at a predetermined position such that the fibers are optically coupled to each other. Dust, dirt, pollen and other airborne contaminates often present a problem for transmitting optic signals because they are often introduced at the optical connections. In addition to the contaminants mentioned above, streaks from alcohol, acetone, oil stains and residual films can present a problem for optical transmissions. Once present, these contaminates degrade the optical signal, sometimes to a point where the transmission is completely obstructed. Inspecting optical fiber connections has been a continual problem in the telecommunications industry due to the minute cross-sectional size of the coupling surface to be inspected and the additional difficulty in accessing the recessed coupling surfaces. Rarely can contaminants be detected using the naked eye, therefore fiber microscopes have become popular for inspecting optical fiber connections.

Hand-held fiber microscopes presently known in the art are used for such inspections. These fiber microscopes allow an operator to peer into an eyepiece and directly view a coupling surface. Fiber microscopes include magnification and focusing optics for magnifying the coupling surface of a fiber while disposed on an optical fiber connector. In use, an operator normally positions the fiber coupling end of a fiber in the optical path of the uptake optics of the microscope and then peers into an eyepiece to examine the fiber coupling surface. Steadying the fiber microscope for accurately visualizing the fiber coupling surface is often difficult due to the high degrees of magnification necessary to examine the coupling surface in detail. Therefore, many fiber microscope models also come equipped with special adapter caps that easily attach to the uptake optics of the fiber microscope and which engage a particular type of male optical connector.

While this system works well for male optical connectors, problems occur when a male connector is engaged in an adapter and cannot be disengaged for inspection. This is the case with optical ports, especially bulkhead ports where a patch fiber is connected to an inaccessible side of a bulkhead adapter. Currently, in situ inspections are impossible because fiber microscopes cannot resolve an optical coupling surface mated to an adapter. The normal method for inspecting a coupling surface using a fiber microscope is to disengage the optical connector from the adapter and then inspect the optical connector separately. Current fiber microscope models are simply too big to be inserted into most adapters. Presently available optical fiber microscopes cannot be used to inspect crucial portions of any female fiber component, such as optic ports or miniature optical sleeves.

Furthermore, the area of the aperture opening of many adapters has been reduced. This is especially true for high density matrix port and block optical port styles where the entry area is condensed to make space for more optical connection in an equivalent area, thereby making inspection by current techniques even more difficult. Presently, several fiber scopes are available, however, the inspection head (encasing the lens and light shaft) and borescope insertion are large (more than ¼ inch in diameter) such that it is impossible to access high density port such as MU, MT, LC and LX component types on optical cross connect, optical ultrabroadband DACS unless neighbor fiber connectors are removed.

Another problem facing the telecommunications industry is the current trend of component manufacturers equipping optical components with shutters. Both connector and adapters are currently equipped with shutters. Optical ports with shutters, such as E2000 (available from and trademarked by Diamond S.A.), LX.5 (available from and trademarked ADC Telecommunications, Inc., Minneapolis, Minn.) make visual inspection even more problematic because the coupling surface is protected by a shutter. Shutters can be affixed to a component externally, or in the case of some types of adapters, internally and recessed from the threshold of the adapter. In more advanced optical components, these shutters are part of a shutter system which cannot be actuated manually without great difficulty for the operator. With respect to these components, even if the fiber microscope's size did allow for entry into the adapter, the target surface would remain hidden from view by the shutter.

A final problem associated with visually inspecting optical components is that moderate power lasers are used to drive the optical signal. Whenever an operator peers into an optical port, care should be taken to avoid the laser beam etching the operator's retina. Laser sources have auto shut-off options; however, intermediate passive and active components, such as patch panels and optical cross-connect ports, do not have such options. There presently exists a great danger to the vision of inspection personnel while the laser source is on.

Currently, there is no solution for the problems described above. If db losses are higher than expected for an optical port, the usual procedure is to pump dry air onto the optical port hoping to free foreign particles from the coupling surface. However, this assumes that contaminants are actually present. Since visually inspecting the optical port is impossible, foreign particles may or may not be present Once the coupled surface has been sufficiently flooded with dry air, the circuit db losses are compared to the previous results. If db losses are reduced, then the process was a success and is repeated until no further db gain can be achieved. Otherwise, the complete board is replaced. Once removed and sent for maintenance, savvy technicians typically open the module case to access the internal optical patch fibers, disengage the optical connectors and inspect the connectors using a fiber microscope as described above. Because optical card failure is so often rooted with the optical connection to the card, it behooves technicians to inspect the optical ports prior to performing any more complex diagnostics on the card.

SUMMARY OF THE INVENTION

The present invention relates to a system and method for in situ inspection of optical ports for occlusions that might impede an optical signal. The present invention utilizes a mini-borescope of the type having a borescope insertion tube of less that two millimeters in diameter. The mini-borescope may utilize a video camera for capturing images of the target and adjustably magnifying the target image for display. In addition, one of a plurality of component type optical adapters is coupled to the mini-borescope insertion tube. Each particular type optical adapter allows the insertion tube to be inserted and aligned to a corresponding type of optical component, for instance, if the optical adapter is an SC-type male connector, then the insertion tube will be readily accepted by an SC-type female adapter. Also included in the optical adapter is a protective sleeve which surrounds a portion of the mini-borescope insertion tube. The protective sleeve provides the insertion tube with added rigidity, thereby lessening the likelihood of accidentally bending the tube during insertion. Optical adapters may also cooperate with component shutter systems for actuating protective shutters during engagement of the optical adapter, thereby exposing the coupling surface without manual intervention.

BRIEF DESCRIPTION OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 1 is a cross-sectional view depicting a prior art fiber optic connector and connector adapter as is commonly used in the telecommunications industry for optically connecting fiber optic lines;

FIG. 2 is a cross-sectional view representing a optical fiber connector being inspected in situ in an optical port configured from an optical adapter being attached to the bulkhead of an optical module;

FIG. 3 is a view of a system for optical port inspections for optical devices in accordance with an exemplary embodiment of the present invention;

FIG. 5 is a cross-sectional view depicting a typical optical port inspection as illustrated with respect to an SC-type environment in accordance with an exemplary embodiment of the present invention;

FIGS. 6A through 6E are cross-sectional diagrams depicting the stages of insertion of an LX.5 connector into an LX.5 adapter in accordance with the prior art;

FIGS. 7A and 7B are cross-sectional diagrams of an optical adapter in accordance with an exemplary embodiment of the present invention and of a typical LX.5 connector; and FIGS. 8A through 8E are cross-sectional diagrams depicting an LX.5-type mini-borescope optical adapter engaging an LX 5-type adapter for inspecting a coupling surface of the optical fiber therein in accordance with an exemplary embodiment of the present invention.

Figure 4A:
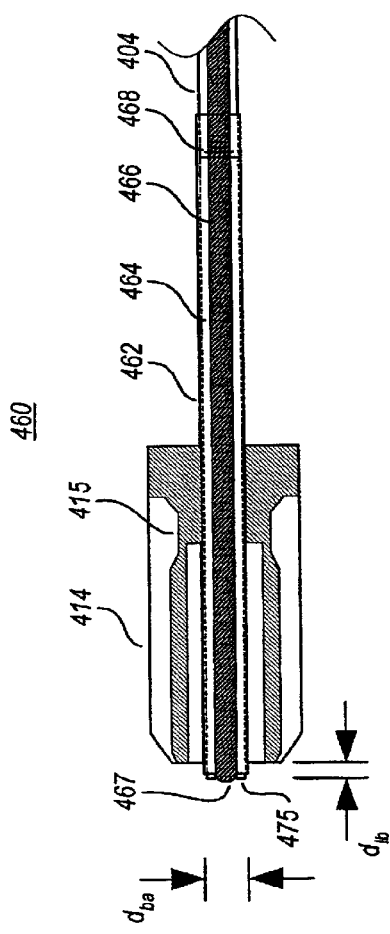
FIGS. 4A and 4B are cross-sectional views of an optical adapter of the present invention and a typical optical connector in side-by-side depictions.

Other features of the present invention will be apparent from the accompanying drawings and from the following detailed description.

DETAILED DESCRIPTION OF THE INVENTION

FIG. 1 is a cross-sectional view depicting a prior art fiber optic connector and connector adapter as is commonly used in the telecommunications industry for optically connecting fiber optic lines. The specific connector and adapter type being illustrated in FIG. 1 is that of SC-type connector/adapter component, i.e. SC connector 112 and SC adapter 102. However, an artisan having ordinary skill in the art will readily realize that the use of an SC type components is merely exemplary and that any type of connector component might be substituted for the SC type components without departing from the original scope and intent of the present invention described herein. Other exemplary component types currently used in the optical communications arts are SC, ST, FC, E2000, LC, LX, MU, MT components types. A complete understanding of the functionality of a particular type of coupling component for that matter, any type of optical coupler is not necessary for understanding and practicing the present invention. Therefore, the components depicted in FIG. 1 will be only briefly described touching on only the elements that are necessary for gaining a better understanding of the present invention. The SC-type components were selected for discussion because the aforementioned type of component is representative of a broad class of components that do not contain internally positioned shutter mechanisms.

Depicted in FIG. 1 is SC connector 112 and SC adapter 102. SC connector 112 is first shown disengaged and apart from SC adapter 102 and then represented engaged within the body of SC adapter 102. Engagement is possible only when oppositely sexed, but matching component types are brought together and mated. Generally connectors are male and adapters are female. Observe that SC adapter 112 rigidly disposes fiber core (or simply fiber) 118 at a predetermined position and orientation within SC adapter 102 with respect SC adapter body 114. As fiber 118 is extremely flexible and prone to breakage and end damage, fiber 118 is further constrained in ferrule 116 which, in turn, is mounted within the interior of body 114. Body 114 holds ferrule 116 in a fixed orientation and position such that coupling surface 119 of fiber 118 is optimized to receive and/or transmit optical signals to another fiber.

Turning to SC adapter 102, optical sleeve or ferrule tube 106 aligns fiber 118 by guiding ferrule 116 along its interior wall upon the insertion of SC connector within SC adapter 102. Clearly, the inner diameter of ferrule tube 106 is slightly greater than the outer diameter ($d_f$) of ferrule 116. Ferrule tube 106 is rigidly positioned within the interior of adapter body 104. The interior surfaces of body 104 cooperates with the exterior surfaces of body 114 such that fiber 118 is rigidly held in a predetermined position with respect SC body 114. Ferrule tube 106 provides a guide means for the insertion of ferrule 116 whenever an SC adapter is engaged within adapter 102 which aligns coupling surface 119 of fiber 118 for optical coupling with another fiber inserted within ferrule 106 from the opposite direction. Notice that the particular adapter configuration depicted in the Figure is an SC-to-SC adapter meaning that the adapter is configured to receive an SC connector at either end. This, of course, is merely exemplary as many adapters are configured for accepting a different type connector at either end while aligning the fibers from each for optical coupling. For instance, a typical optical adapter may be configured to adapt a first optical connector type to a second optical connector type (e.g., FC to SC or ST to SC or some other combination of connector types). With respect to the descriptions below, an optical port may be considered as being synonymous with an adapter, wherein the adapter is affixed to the surface of a device, such as an optical module. These optical ports are often referred to as bulkhead adapters because they physically traverse a bulkhead of an enclosed unit and provide ingress and egress means for signals to the interior of the device.

With respect to the depicted example, SC adapter 102 has at its furthermost exterior extent optional external shutter 108. Dirt, dust, pollen and other particulate matter are of particular concern with respect to optical connections because even a particulate of minute dimensions may impede the flow of the optical signal. Thus, in the case of adapter 102, when the optical port is not in use, shutter 108 is manually closed, or in most cases, is automatically closed when an SC connector is not present, thus protecting fiber 118 from becoming contaminated with airborne particles. External shutter 108 provides still another valuable function in that many times fiber 118 may emit an active laser signal even though adapter 102 is not in use. In those cases, the card or module on which SC adapter 102 is attached will emit a laser beam which may be harmful to the retina of persons happening to gaze at the adapter.

Observe that SC adapter 102 is connected to bulkhead 120 through an adapter orifice in bulkhead 120 and secured in position by means of a pair of flexible members 109. Thus, as shown in the present Figure, SC adapter 102 may be mounted on the front or rear bulkheads of any card or module used for the transmission or processing of optical carrier signals, but normally, SC adapter 102 is mounted on the inner wall of bulkhead 120 thereby creating an exposed optical port on the outer wall of bulkhead 120.

As mentioned above, dirt, dust, pollen and other particulate matter may become lodged on the coupling surface of fiber 119 which reduces optical transmission performance. In addition, coupling surface 119 of fiber 118 is also prone to scratching from improper handling and/or contact with another fiber during coupling which further impedes the flow of the optical signal from one fiber coupling surface to another. Thus, prior coupling a pair of optical connectors (i.e., an optical connector to an adapter), it is a good practice to visually check the optical connections for any foreign matter that may occlude the coupling surfaces and impede the flow of the optical signal. Similarly, whenever an optical card or module exhibits a higher than normal error rate or fails outright, checking the optical connections for foreign occluding matter as a precursor to troubleshooting the internal electronics may save valuable time and expense.

However, visually inspecting the coupling surface with the naked eye is virtually impossible due to the extremely minute diameter, $d_f$, of the cross section of coupling surface 119 on fiber 118. Coupling surface 119 is magnified in order to visualize any substance that may interfere with the transmission to or from the respective fiber coupling surfaces. Normally, a hand-held fiber microscope such as those available from Noyes Fiber Systems in Belmont, N.H. or Westover Scientific in Woodinville, Wash. are used for such inspections. Typically, these fiber microscopes include magnification and focusing optics for magnifying the coupling surface of a fiber while disposed on an optical fiber connector. Magnification ranges are available on various fiber microscopes from between 200X to 600X for imaging the coupling end of a fiber. In use, an operator normally positions the fiber coupling end of a fiber in the optical path of the uptake optics of the microscope and then peers into an eyepiece to examine the fiber coupling surface. As can be imagined, steadying the fiber microscope for accurately visualizing the fiber coupling surface is often difficult due to the high degrees of magnification necessary to examine the surface. Therefore, many fiber microscopes models also come equipped with special adapter caps which easily attach to the uptake optics of the fiber microscope which engage a particular type of optical connector such as an SC, ST or FC connector. Once a connector is connected into the adapter cap of the fiber microscope, the fiber coupling surface is automatically aligned with an optimal viewing orientation for visualizing the fiber coupling surface and, as such, is easily examined for occlusions by an operator.

While this system works well for male optical connectors, problems occur when a connector is to be examined in situ, that is, in place while engaged in an adapter, for instance, when an optical connector is engaged in a female adapter that is configured on a bulkhead of an optical module or processing card.

FIG. 2 is a cross-sectional view representing an optical fiber connector being inspected in situ in an optical port configured from an optical adapter being attached to the bulkhead of an optical module. Notice that FIG. 2 depicts an identical SC adapter/connector combination 200 as shown above with respect to FIG. 1 which, as alluded to above, is only one possible optical coupling configuration that might be present for examination. With respect to the Figure, fiber microscope 250 has been positioned along an optical axis that would allow the best vantage point for viewing the coupling surface 219 of fiber 218. Notice that $d_f$, that is the diameter of the optical uptake portion of fiber microscope 250, is extremely large with comparison to the diameter $d_f$ of ferrule 216 or ferrule tube 206 and also that diameter $d_f \gg d_f$ such that neither lens 252 nor ferrule 254 can be received within the opticalport Thus, as is plain to see, fiber microscope 250 cannot be inserted within the hosing 204, much less within the inner extent of ferrule tube 206 on SC adapter 202. Therefore, an operator is left with the alternative of positioning fiber microscope 250 at the outer extent of adapter 202 and peering through that opening in an effort to visualize coupling surface 219 of fiber 218. In such a situation, the operator is rarely ever able to visualize an image of anything other than the first few millimeters of the interior of adapter 202 due to the optical focal distance of fiber microscope 250. It is impossible, given the prior art technology, to focus on coupling surface 219 of fiber 200 when that surface is recessed within ferrule tube 206 of the outboard side of adapter 202. If the adapter is positioned such that SC connector 212 can be disengaged from adapter 202, then the operator can visually inspect coupling surface 219 of fiber 218 using fiber microscope 250. If, however, as is often the case, the coupling end of fiber 212 is completely enclosed within the module housing, then fiber coupling surface 219 cannot be inspected for occlusions or scratches without physically removing the module from the system, disassembling the module, removing the fiber patch cord, including uncoupling SC connector 212, and then visually inspecting the card with fiber microscope 250 as discussed above This shortcoming in the prior art has led to most operators implementing a procedure of first attempting to clean the coupling end of fiber 212, re-testing the card, and then upon an unsuccessful test, removing the card for further evaluation. The cleaning process has currently evolved to the point where most operators merely open the shutter (if the adapter is configured thusly), blow a puff of air within the extent of the adapter hoping to clear away any debris from the optical coupling surface, and then re-test the card.

A second, and sometimes more serious problem with this procedure, is the fact that many times fiber 218 will be live, carrying an optical signal, emitting a laser beam from the coupling end. Thus, when the user peers into adapter 202 with fiber microscope 250, even though the user cannot properly focus on coupling surface 219 of fiber 218, the full force of the laser beam may be received within lens 252 and directed straight to the operator's retina which can lead to serious retinal damage to the operator. What is needed is a safe and effective means for examining the coupling surfaces of optical fibers within a plurality of different adapter types while the adapter functions an optical port on an optical module, whereby the inspection is accomplished in situ, while the module remains in place and, if possible, in use.

FIG. 3 is a cross-sectional view of a system for optical port inspections of optical devices in accordance with an exemplary embodiment of the present invention. The present invention is composed of two primary components, the first being an industrial mini-borescope of the type conventionally used in the visual inspection arts, and the second being a replaceable optical port adapter for configuring the borescope for inspecting a variety of different types of optical connector adapters. With respect to FIG. 3, mini-borescope 300 consists of mini-borescope insertion tube 304, handle 302, and eyepiece 308. With respect to some borescope models, handle 302 and mini-borescope insertion tube 304 are more properly referred to as a videoscope, as handle 302 contains a built-in video camera for transmitting a video signal to monitor 306. Often eyepiece 308 is replaced with monitor 306 which is mounted on handle 302 for displaying the target image. Operationally connected to mini-borescope 300, power supply and control device 310 supplies power to the electronics in mini-borescope 300 and includes a xenon light source with the corresponding light intensity adjustment controls. Optionally, power supply and control device 310 might also contain image enhancement processing capability for augmenting images received from mini-borescope 300, along with the software necessary for invoking the image enhancement algorithms. Power supply and control device 310 may also be fitted with monitor 306 for displaying the target image.

It should be understood that the descriptions of mini-borescope 300 and power supply and control device 310 are merely exemplary and the specific configuration of the mini-borescope in no way affects the performance or use of the present invention, with the exception of that described below. One feature that distinguishes mini-borescope 300 from conventional borescope devices is the diameter of mini-borescope insertion tube 304. Typically, borescope insertion tubes have a diameter of 5–16 millimeters, of which the most popular is the eight millimeter diameter borescope insertion tube. With respect to the present invention, an exemplary mini-borescope is one in which the diameter of the mini-borescope insertion tube 304 is approximately equal to or slightly less than a typical fiber optic ferrule disposed within a conventional optical connector. Typically, the diameter of a fiber optic ferrule is approximately 1.2 millimeters in diameter.

Connected to the lens end of mini-borescope insertion tube 304 is mini-borescope-to-optical port adapter (BOPA) 360. The body of BOPA 360 is similar in construction to the type of connector that is compatible with the optical port to be inspected. Therefore, the borescope-to-optical port adapter is also compatible with the optical port to be inspected. Thus, BOPA 360 engages a like-type optical port of the opposite sex in much the same manner as optical connector engaging a like-type adapter. It follows then that BOPA 360 cannot be a single component type because it should be compatible with a variety of different optical port types. Mini-borescope insertion tube 304 is be reconfigured with a matching type of BOPA 360 for the type of adapter in the optical port to be inspected. Therefore, a variety of different type BOPAs that are compatible with optical ports to be inspected should be available.

Subsequent to BOPA 360 engaging an optical port, the coupling surface of an optical fiber is oriented on the optical axis of the borescope's lens and within its proper depth field of view. An image of the coupling surface of the fiber can then be captured by mini-borescope 300, thereby allowing the operator to safely examine the coupling surface for occlusions or scratches that might impede an optical signal.

Optical port contamination and/or optical coupling surface defects can reduce overall system gain by several db thus severely affecting the Bit Error Rate (BER). In accordance with an exemplary embodiment of the present innovation, inspecting an optical port using like-type BOPA 360 and mini-borescope 300 reduces the cleaning process time normally involved with examining an optical port of an optical occlusion, i.e. repeatedly blowing air into the port and then measuring the change in power. Occlusions and scratches on an optical fiber's coupling surface are easily recognized from a magnified image of the coupling surface, thereby positively identifying a source of trouble, or eliminating a possible trouble spot, before condemning an optical module or board. By accurately diagnosing the source power loss as port contamination and/or optical coupling surface defects, unnecessary board replacement can be avoided and, in many cases, the defective optical port can be cleaned while remaining in place. Even in cases where the board is removed for maintenance, the optical port is eliminated as a potential trouble spot, that is, of course, unless the operator is unable to refurbish the coupling surface in the field, and even then turn-around time for card maintenance is greatly reduced because one source of the power loss has been identified prior to the card being removed for service. Clearly, the present invention provides a mechanism for identifying problems with optical ports in situ and most problems can be resolved in the field with little effort by the operator. Moreover, the application of the present invention is not limited to operational equipment. Instead, utilization of the present invention on optical test equipment can lead to a reduction in errors from optical testing instrument due to contamination, surface defect or poor optical transmission, just as may be realized from operational equipment. Finally, because mini-borescope 300 uses a mini-video camera for transmitting a video signal to monitor 306, eyepiece 308 is eliminated and therefore the incidences of retina damage due to power laser source is greatly reduced, as is a corresponding reduction in liability.

The operation of mini-borescope 300 is extremely basic, not much more complicated than engaging an optical connector into the port to be inspected. To inspect an optical port, the operator first selects the appropriate size borescope insertion tube. Tube diameters vary from approximately 1.2 millimeters to 1.7 millimeters, and even smaller depending on the particular manufacturer's model design. The mini-borescope is then turned on (recall that the borescope is actually a videoscope that captures images of a target using a mini-video camera). The operator equips the mini-borescope insertion tube 304 with a borescope-to-optical port adapter that matches the type of optical port to be examined and locks the optical adapter onto mini-borescope insertion tube 304. BOPA 360 is then inserted directly into an optical port which is similar to inserting an optical connector into the port. Images of the coupling surfaces are then captured and displayed for the operator on monitor 306. Often the monitor is a lightweight LCD panel that can be physically joined to handle 302 for convenience. Because the images are projected on monitor 306, the condition of an optical port can be positively determined even when the power laser source is active without the possibility of retina damage from laser light. Prior art borescopes frequently employ a laser filter to protect the operator's retina from damage, but the chance still exists of light leaking past a filter. Finally, the operator can make appropriate adjustment to focus and lighting for best images, while BOPA 360 can be manipulated forward and back or from side to side to examine all aspects of the optical port, including the coupling surface of optical fibers, optical sleeves, and even the connectors, or adapters, themselves.

In accordance with exemplary embodiments of the present invention, optical ports can be visually inspected and accurate results can be obtained as to the condition of the optical ports (versus guessing). By using the present invention, troubleshooting time can be reduced. In addition, because operators are not subjected to a directed view of the target surface, laser damage to the retina is impossible. Moreover, exemplary embodiments of the present invention can be configured for virtually any optical port that currently mate to an optical connector, including ports with deeply recessed coupling surfaces, high density matrix blocks, shuttered ports, internal or external, and the myriad connection components that were heretofore not inspected at any stage (i.e., ferrule tubes, etc.) Current production mini-borescope models exist that can adapt to any type of fiber connectors with ferrule a diameter of 1.2 millimeters; however, smaller diameters are possible and will be available in future production models. Because the mini-borescope insertion tube engages a borescope-to-optical port adapter using BOPA 360, neither the borescope microlens or the fiber cores are subject to accidental scratches or damage. BOPA 360 maintains a predetermined interval between the borescope microlens and the coupling surface of the fiber that cannot be adjusted by the operator.

The borescope-to-optical port adapter protects the borescope barrel from bending, thus breaking its internal lens. It also acts as an adapter to optical fiber connectors to keep the borescope lens and optical ports from scratching. Still further, with regard to other embodiments, the borescope-to-optical port adapter maintains proper depth field of view and facilitates insertion into optical ports or bulkheads with shutters (LX0.5, E2000, etc.). In accordance with an exemplary embodiments of the present invention, borescope-to-optical port adapters can be used to convert a mini-borescope to inspect laser transmitter and receiver ports, optical amplifiers, high-density (high port counts) optical switches, and optical cross connectors. With regard to other embodiments, the borescope-to-optical port adapter can be used to convert an mini-borescope to inspect optical testing instruments such as O/E (optical-to-electrical) and E/O converters, power meters, Optical Time Domain Reflectometers (OTDR), laser modulators, Dense Wavelength Division Multiplexing (DWDM) system test sources, Polarization Mode Dispersion (PMD) and Polarization systems, non-contact interferometers (such as ZX-1 micro available and trademarked by Digital Optical Research Company, Phoenix, Ariz.). Finally, with regard to still other exemplary embodiments, the borescope-to-optical port adapter can be used to convert a mini-borescope to inspect an optical fiber scope, optical sleeves, optical patch panel connectors, optical fiber connectors, fiber optic bulkheads, bulkhead adapters, fiber optic stripping tools (such as Micro-Strip), Radio Frequency Synchronous Add/Drop Multiplexers (RF SMA) ports.

Figure 4B:
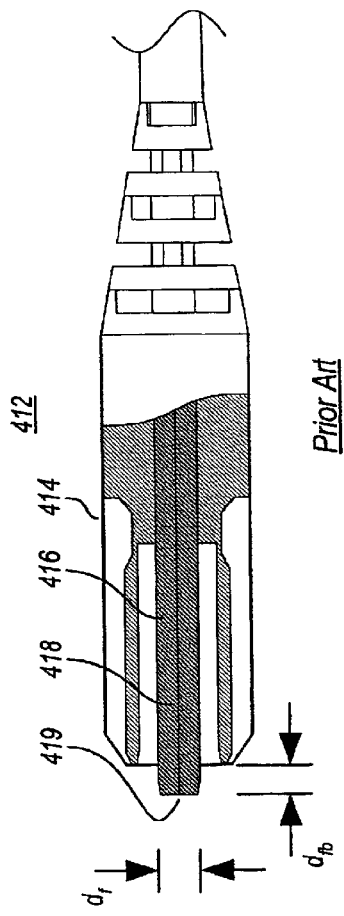

FIGS. 4A and 4B are cross-sectional views of a borescope-to-optical port adapter of the present invention and a typical optical connector in side-by-side depictions, respectively. Again in this illustration, a SC-type connector is used for the comparison. Turning to FIG. 4A, an enlarged cut-a-way view of a mini-borescope rod is shown in conjunction with the BOPA of the present invention. Mini-borescope insertion tubes are comprised of two basic elements: the light element and the viewing element Optical rod 466 traverses the length of mini-borescope insertion 404 tube from the handle to lens 467 and is typically surrounded by light shaft 464. Light shaft 464 conveys from a light source and emits light beams from end 475 for illuminating a target. Light rod 464 may be a single optical rod for transmitting light, but often light rod 464 is configured from a plurality of smaller individual optical fibers which are bundled around optical rod 466 and optically connected to a light source via a coupling flange. In any case, both light rod 464 and optical rod 466 are securely held within mini-borescope insertion tube 404. On most standard borescope models, the insertion tube is rigid and strong enough to provide adequate protection for both the optical rod and the light fibers against accident breakage from cantilever tensions applied across the insertion tube. However, such is not usually the case with respect to mini-borescopes. Mini-borescope insertion tube 404 stemming from a mini-borescope is much less rigid than that of its conventional counterpart, and optical rod 466 can often be damaged if insertion tube 404 is bent. Therefore, in accordance with another exemplary embodiment of the present invention, protective sleeve 462 surrounds insertion tube 404 and provide additional resistance to accidental bending. The additional rigidity provided by protective sleeve 462 allows BOPA 460 to be mated with a variety of types of optical port, even those requiring BOPA 460 to be forcibly engaged to the optical port.

It is expected that protective sleeve 462 locks or snaps to the exterior of insertion tube 404 via locking means 468 at a predetermined location and that optical adapter body 414 is permanently fastened to protective sleeve 462. Recall that the components cannot properly mate unless the components are of a like type and opposite sex. Therefore, in that case, a particular BOPA 460 is selected based on the type of optical adapter body matching the optical port to be inspected. Once chosen, the entire protective sleeve/optical adapter body combination (462/414) is locked into place on insertion tube 404. However, in accordance with another exemplary embodiment, optical adapter body 414 may be removed and replaced from protective sleeve 462. In this case, protective sleeve 462 may remain attached to insertion tube 404 while a matching type of optical adapter body 414 is selected for an optical port to be inspected, and that optical adapter body is then locked onto protective sleeve 462 (lock not shown).

As in the illustrations described above, BOPA 460 depicted in the present Figure is that of an ST-type optical adapter designed for mating with a corresponding ST-type adapter. Still again, the ST-type optical components used in the Figure descriptions are merely exemplary and the ordinary artisan will readily recognize the use of ST-type components in the illustration is in no way intended to limit the scope of the present invention. Notice that by comparing BOPA 460 illustrated in FIG. 4A with ST connector 412 illustrated in FIG. 4B, it can be seen that ST body 414 is present in both components. With respect to ST connector 412, ST body 414 secures ferrule 416 and fiber 418 in a predetermined position. By contrast, ST body 414 performs the function of an optical adapter body for securing protective sleeve 462, mini-borescope insertion tube 404, light rod 464 and optical rod 466 in a predetermined position with respect to BOPA 460. For purposes of inspecting coupling surfaces of optical fibers in an adapter portion of an optical port, body 414 may be fabricated as a substantial replica of that used on ST adapter 412. Recall that ST-type connectors are merely exemplary and that the present invention envisions the use of any type of component. One of ordinary skill in the art will recognize that body 414 may be modified for specialized applications in use with BOPA 460 or for accepting protective sleeve 462 with a larger, or even smaller, diameter than that of ferrule 416. Furthermore, it may be useful to omit the locking mechanisms from body 414, such as engagement channel 416, when in use with BOPA 460 thus allowing the operator to readily change the field of view during inspection by reciprocating BOPA 460 forward and back from coupling surface 419. In that case, the operator merely pulls BOPA 460 away from the optical port to increase the field of view and expand the target area. Removal of the engagement locks allows the operator to complete this motion in a smooth, consistent manner because the engagement locks cannot then interfere with the movement of BOPA 460. In still another modification in accordance with another exemplary embodiment, body 414 is fabricated with slightly looser external dimensional tolerances for use with BOPA 460. In so doing, an operator may obtain an even more complete view of an even wider target area simply by maneuvering BOPA 460 from side to side. While loosening the external dimensional tolerances might provide some benefit for inspecting an optical port containing a single optical fiber, expanding the target viewing area is even more helpful when inspecting optical ports containing multiple coupling surfaces from multiple optical fibers. In some cases, an optical port may contain coupling surfaces which lay outside the effective field of view for the mini-borescope. Merely pulling BOPA 460 away from the optical port may not increase the field of view enough to visualize outlying coupling surfaces while maintaining proper focal distance. In those cases, the looser external tolerances on body 414 allow the operator to sweep the optical axis laterally (peripherally) and thereby increase the effect field of view for inspecting an increased target area without increasing the focal distance.

Returning to the comparison Figures of FIGS. 4A and 4B, notice that the diameter $d_{ba}$ of borescope adapter 460 is less than or equal to that of the diameter $d_f$ of the ferrule for a corresponding connector type, in this case, the ST-type connector. Recall that the coupling surface of an optical fiber is often recessed within the ferrule tube and disposed within an adapter portion of an optical port (observe ferrule tube 206 depicted in FIG. 2). It is unlikely that detailed images may be obtained with lens 467 and light shaft end 475 positioned external to the ferrule tube. Better images of the coupling surface are possible when lens 467 and light shaft end 475 are positioned internally within the ferrule tube itself. By assuring that the diameter $d_{ba}$ of borescope adapter 460 is less than or equal to the diameter $d_f$ of the ferrule, clearance is guaranteed for protective sleeve 462 to be inserted into the ferrule tube.

Finally, it should be understood that lens 467 and light shaft end 475 is protected from accidental damage during optical port inspections. To this end, notice also that borescope adapter 460 is configured such that the distance between the furthest extent of lens 467 and the forward-most shoulder of body 414, $d_{lb}$, is less than the corresponding distance, $d_{fb}$, for SC connector 412 (i e., between coupling surface 419 and the forward-most shoulder of body 414). Lens 476 is set back closer to body 414 in order to protect the lens from being accidentally scratched or damaged during insertion into an adapter. It should be further understood that the position of lens 476 with respect to body 414 is also a function of the optical focal distance of the particular type mini-borescope optics. Thus, lens 476 may be positioned even further from that of the respective end of ferrule 416 than that represented in the Figures in order to preserve the proper focal distance for the particular model of mini-borescope.

Turning now to FIG. 5, a cross-sectional view depicting a typical optical port inspection is illustrated with respect to an SC-type environment in accordance with an exemplary embodiment of the present invention. Here, a typical optical port (such as a bulkhead port) is represented comprising SC-type adapter 502 shown mated with SC-type connector 512. SC-type connector 512 is similar to that described above with respect to FIGS. 1 and 2 comprising fiber 518 circumferentially enclosed by ferrule 516 and both being secured in ST-type body 514. Inspecting an optical port that is configured as shown in FIG. 5 involves an operator opening shutter 508 to expose the interior of SC adapter 520 along with coupling surface 519. Next, the operator inserts mini-borescope insertion tube 506 into ferrule tube 506 by engaging body 514 of mini-borescope adapter 560 as depicted. Notice that optical lens 576 is positioned adjacent to, but in not contact with, coupling surface 519 of fiber 518 within ferrule tube 506, thus maintaining the proper focal distance. The cavity formed in ferrule tube 506 between optical lens 576 and coupling surface 519 also allows light emitted from light shaft end 575 to eliminate coupling surface 519.

It should also be understood that, although mini-borescope adapter 560 is depicted fully engaged within ST adapter 502, a minimal gap exists between the exterior of body 514 and the interior of adapter body 504. This gap allows space for manipulating mini-borescope adapter 560, thus allowing the operator to redirect the viewing axis onto different portions of ferrule 516. While this feature is somewhat useful for single fiber connections and applications, the ability to redirect the viewing axis onto multiple fibers is more helpful for inspecting multiple coupling surfaces on connectors which have manifolds for simultaneously securing multiple optical fibers.

The accumulation of dirt, dust and other debris (along with streaks from alcohol, acetone, oil stains and residual films ) on the coupling portion of a fiber reduces the effectiveness of the fiber optic system and increases errors in data transmission. Recently, in an effort to diminish the occurrence of this problem, optical component manufacturers have utilized shutters to protect the coupling surface of an optical fiber. While shutters on connectors and adapters have been known in the industry, typically shutters have been designed as a manually operated feature wherein an operator manually open the shutter in order to insert a connector, as described above with respect to FIGS. 1, 2 and 5. Additionally, shutters have normally been incorporated only on an adapter body and not on optical connectors. Coupling surfaces located on connector ends were protected by using replaceable caps which were removed prior to engaging the connector into an adapter and subsequently replaced after the connector was disconnected. The prior art system of external shutters and replaceable connector caps was manually extensive, requiring operators to perform extra procedures to lessen the occurrence of contamination. Operators often shortcutting the system resulting in unwanted contamination on coupling surfaces.

Component manufacturers came to realize that in order to make their products more reliable, a mechanism had to be provided wherein the coupling end of a fiber was always protected whether or not the fiber was in use. Moreover, the mechanism had to be automatically actuated, thereby relieving operators from performing extra manual steps necessary to protect the coupling surfaces. An example of such a connector and adapter pair is that of the LX.5 component system (a trademark of and available from ADC Telecommunications, Inc., P.O. Box 1101, Minneapolis, Minn. 55404-1101).

FIGS. 6A through 6E are cross-sectional diagrams depicting the stages of insertion of an LX.5 connector into an LX.5 adapter in accordance with the prior art. As discussed above with respect to other prior art connector and adapter systems, FIGS. 6A through 6E will be described only with the detail necessary for practicing the present invention. Other features and advantages of the connector/adapter system may be present in addition to those described below. The specific connector and adapter types being illustrated in FIG. 6 are that of LX.5-type connector/adapter components (i e., LX5 connector 612 and SC adapter 602), used herein as a means for describing the applicability of the present invention to optical components with automatically-actuating shutter systems, in contrast to manually-actuated shutter systems described above. An artisan having ordinary skill in the art will readily recognize that the use of an LX.5-type component is merely exemplary and that any type of connector component which incorporates automatically-actuating shutter systems might be substituted for the SC-type components without departing from the original scope and intent of the present invention.

Optical connector/adapter system 600 consists of LX.5 adapter 602 and LX.5 connector 612. With respect to LX.5 connector 612, LX.5 connector 612 comprises external shutter 620 which is rigidly connected to shutter cam 622 which is pivotally mounted on LX.5 connector 612. As will be described in more detail below, shutter cam 622 cooperates with corresponding cam pin 609 on LX.5 adapter 602 for automatically actuating external shutter 620 open and closed simultaneously with engagement and disengagement of connector 612 to adapter 602. External shutter 620 remains in the normally closed position thereby protecting coupling surface 619 when connector 612 is not in use, when engaged with LX.5 adapter 602; however, external LX.5 connector shutter 620 pivots into the open position. LX.5 connector 612 utilizes internal adapter shutter cam 624 for opening internal shutters 608 disposed within LX.5 adapter 602. Opening and closing the shutters on LX.5 component system 600 will be discussed below with respect to FIGS. 6A through 6E. In addition to the above-described components, LX.5 connector 612 comprises ferrule 616 for containing fiber 618, which is terminated in coupling surface 619 for transmitting and receiving optical signals for another optical component. Connected to body 614 is depressible latch 626 which, during engagement with LX.5 adapter 602, is depressed enough to provide clearance to engage body 604 and to cooperate with combination latch cam and catch 607 on body 604 for securing LX.5 connector 612 to body 614 of LX.5 adapter 602.

With respect to adapter 602, adapter 602 is shown mounted on bulkhead 620 as might be present on any one of a number of devices having an optical port (e.g., optical amplifier, optical switch, optical cross connector, etc.). Adapter 602 comprises ferrule tube 606 that is secured within body 604. Ferrule tube 606 is of sufficient diameter to receive ferrule 616 of LX.5 connector 612 and is protected at either end by a pair of internal shutters 608. Internal shutters 608 are held in a normally closed position via torsion springs on the respective shutters except when accommodating ferrule 616. In the closed position, internal shutters 608 protect coupling surface 619 of fiber 618 from airborne contaminate that might otherwise occlude the optical transmission. Also contained within body 604 is a combination latch cam and catch 607 that cooperates with depressible latch 626 and a pair of shutter cam pins 609 that engage and cooperate with shutter cam 622 disposed on LX.5 connector 612 for actuating connector shutter 620 during insertion of LX.5 connector 612.

The operation of the shutter system of the LX.5 adapter system will now be described with respect to FIGS. 6A through 6E. Notice that as depicted in FIG. 6A connector 612 is aligned and partially enters the internal cavity of LX.5 adapter 602. Turning now to FIG. 6B, the exterior face of exterior connector shutter 620 is in contact with the exterior wall of interior adapter shutter 608 which is shown partially open. With respect to FIG. 6C, LX.5 connector 612 continues to be inserted within LX.5 adapter 602 wherein internal adapter shutter 608 is forced further open to accommodate the vertical extent of external connector shutter 620. Notice also at this point in the mating that internal shutter cam 624 makes initial contact with internal shutter 608. Turning now to FIG. 6D, LX.5 connector 612 travels further within body 604 of LX.5 adapter 602 at which point internal shutter cam 624 fully engages internal shutter 608 and forces the shutter to open to its fullest open extent. Notice also that external connector shutter 620 is now partially opened. External shutter 620 rotates to the open position in response to cam pin 609 engaging a U-shaped cavity disposed within external connector shutter cam 622. As LX.5 connector 612 is thrust further within body 604 of LX.5 adapter 604, connector shutter cam 622 rotates in response to relative movement cam pin 609 with respect to the position of LX.5 connector 612. Connector shutter 620 continues to open as cam pin 609 traverses the lateral extent of connector shutter cam 622. In its final position shown in FIG. 6E, cam pin 609 has completely traversed the extent of external connector shutter cam 622 causing external connector shutter 620 to rotate in its full open position. There, ferrule 616 and fiber 618 have been fully accepted within ferrule tube 606 causing coupling surface 619 to reach its deepest depth within ferrule tube 606. Latch 626 is received by cam and latch 607, thereby securing LX.5 connector 612 to LX.5 adapter 602. It should be understood that the aforementioned connectors may be exemplary. Other connectors with the internal and external shutters, whether manually or automatically operated, will have features and attributes unique to those connector and adapter systems.

Turning now to FIGS. 7A and 7B, a cross-sectional diagram of an mini-borescope-to-optical port adapter in accordance with an exemplary embodiment of the present invention, is depicted adjacent to a cross-sectional diagram of a typical LX.5 connector as was described above. FIGS. 7A and 7B are substantially similar to FIGS. 4A and 5B in many respects and that the primary distinctions between the respective Figures in the manner in which the automatically-actuated shutter system functions shown in FIGS. 7A and 7B. With respect to FIG. 7A, LX.5 BOPA 760 is shown fastened to mini-borescope insertion tube 704 as described above with respect to FIGS. 3, 4A and 4B. Here, LX.5 BOPA 760 is connected to mini-borescope insertion tube 704 using locking means 768 in an identical manner as employed for any other optical adapter such as that described above with respect to SC adapter 460 on FIG. 4A. BOPA 760 comprises body 714 which may be permanently or temporarily affixed to protective sleeve 762. If permanently mounted on protective sleeve 762, then protective sleeve 762 is unlocked and replaced from mini-borescope insertion tube 704 for each different type of optical port to be inspected. If, on the other hand, body 714 is temporarily affixed to protective sleeve 762, then the mini-borescope can be reconfigured for different optical component types by merely interchanging body 714 with another component type body.

Optical adapter body 714 of BOPA 760 shown in FIG. 7A is substantially similar to that shown in FIG. 7B of body 714 of LX.5 connector 712. Functionally, each of body 714 comprises external connector shutter 720 and cooperating external connector shutter cam 722 for protecting either lens 767 on optical rod 766 for BOPA 760 or coupling surface 719 of fiber 718 for LX.5 connector 712. Also depicted in the respective Figures is internal adapter shutter cam 724 for opening an internal adapter shutter and depressible latch 726 for securing BOPA 760 to an adapter. It should be understood that, in accordance with one embodiment of the present invention, locking mechanisms such as depressible latch 726 may be omitted from BOPA 760 in order to allow the operator to readily change the field of view during inspection by reciprocating BOPA 760 forward and back from coupling surface 719. Removal of depressible latch 726 allows the operator to complete this motion in a smooth, consistent manner because the lock does not retard the movement.

BOPA 760 differs from LX.5 connector 712 in that, rather than body 714 securing ferrule 716 and optical fiber 718 in a predetermined position, body 714 secures protective sleeve 762 which surrounds mini-borescope insertion tube 704, light rod 764 and optical rod 766. Again, protective sleeve 762 is disposed around mini-borescope insertion tube 704 to provide the necessary rigidity for engaging BOPA 760 in optical ports. Optical rod 766 is necessary for transmitting images of a target received from lens 767 to imaging electronics and ultimately the display screen, while light rod 764 is a light medium for transmitting light from a light source to light rod end 765 for illuminating the target.

With respect to still another modification in accordance with another exemplary embodiment, body 714 may be fabricated with slightly looser external dimensional tolerances for use with BOPA 760 which allows the operator more freedom to manipulate BOPA 760 from side to side, thus able to acquire images from a larger target area. Loosening the external dimensional tolerances is even more helpful in situations involving inspection of optical ports containing multiple coupling surfaces from multiple optical fibers.

Returning to the comparison Figures of FIGS. 7A and 7B, notice that the diameter $d_{ba}$ of borescope adapter 760 is less than or equal to that of the diameter $d_f$ of ferrule 716 for a corresponding connector type (the LX.5 component type is shown). By assuring that the diameter $d_{ba}$ of protective sleeve 762 on mini-borescope adapter 760 is less than or equal to that of the diameter $d_f$ of ferrule 716, clearance is guaranteed for protective sleeve 762 to be inserted into the ferrule tube.

Mini-borescope adapter 760 should be configured such that the likelihood of damage to lens 767 and light shaft end 775 is lessened during inspections. To this end, notice also that borescope adapter 460 is configured such that the distance between the furthest extent of lens 467 and the forward-most shoulder of body 414, $d_{fb}$, is less than the corresponding distance, $d_{fb}$, for LX.5 connector 712 (i.e., between coupling surface 719 and the forward-most shoulder of body 714). Lens 776 is set back closer to body 714 in order to protect the lens from being accidentally scratched or damaged during insertion into an adapter. It should be further understood that the position of lens 776 with respect to body 714 is also a function of the optical focal distance of the particular type mini-borescope optics. Thus, lens 776 may be positioned even further from that of the respective end of ferrule 716 than that represented in the illustrations in order to preserve the proper focal distance for the particular model of mini-borescope while borescope adapter 760 is fully engaged within the optical port being inspected.

In accordance with an exemplary embodiment of the present invention, when BOPA 760 is attached to mini-borescope insertion tube 704, an optical port can be easily engaged and a coupling surface enclosed with no more difficulty than engaging an optical connector to an optical port (BOPA 760 and the optical port should, of course, be compatible component types).

FIGS. 8A through 8E are cross-sectional diagrams depicting an LX.5-type mini-borescope-to-optical port adapter engaging an LX.5-type adapter for inspecting a coupling surface of the optical fiber in accordance with an exemplary embodiment of the present invention. FIGS. 8A through 8E correspond to FIGS. 6A through 6E in that each corresponding Figure shows a key insertion stage between a connector (or optical adapter) and an adapter of an optical port. Therefore, because the key insertion stages of the mating process have been discussed in great detail above, the discussion of FIGS. 8A through 8E will focus primarily on differences between engaging a connector and engaging a borescope-to-optical port adapter into an adapter on an optical port.

With respect to the present diagrams, LX.5 connector 812 is fully engaged in LX.5 adapter 802 and coupling surface 819 of fiber 818 is in position for inspection in ferrule tube 806. FIGS. 8A through 8E show insertion positions of BOPA 860 with respect to LX.5 adapter 802. With respect to FIGS. 8A–8D, an operator inserts BOPA 860 into adapter 802 while external connector shutter 820 on BOPA 860 remains closed, thereby protecting lens 867 of optical rod 866 until body 814 is fully engaged within body 804.

At that point, as depicted in FIG. 8B, the exterior face of exterior connector shutter 820 is in contact with the exterior wall of interior adapter shutter 808 causing it to partially open. With respect to FIG. 8C, BOPA 860 continues to engage LX.5 adapter 802 and internal adapter shutter 808 is forced open to accommodate the vertical extent of external connector shutter 820. Simultaneously, internal shutter cam 824 contacts internal shutter 808 causing it to open to its fullest extent. As BOPA 860 (FIG. 8D) continues into body 804 of LX.5 adapter 802, internal shutter cam 824 fully engages internal shutter 808 and opens it to its fullest extent. At this point, external connector shutter 820 is not completely opened until cam pin 809 engages a U-shaped cavity on connector shutter cam 822 and traverses it.

Figure 8E:
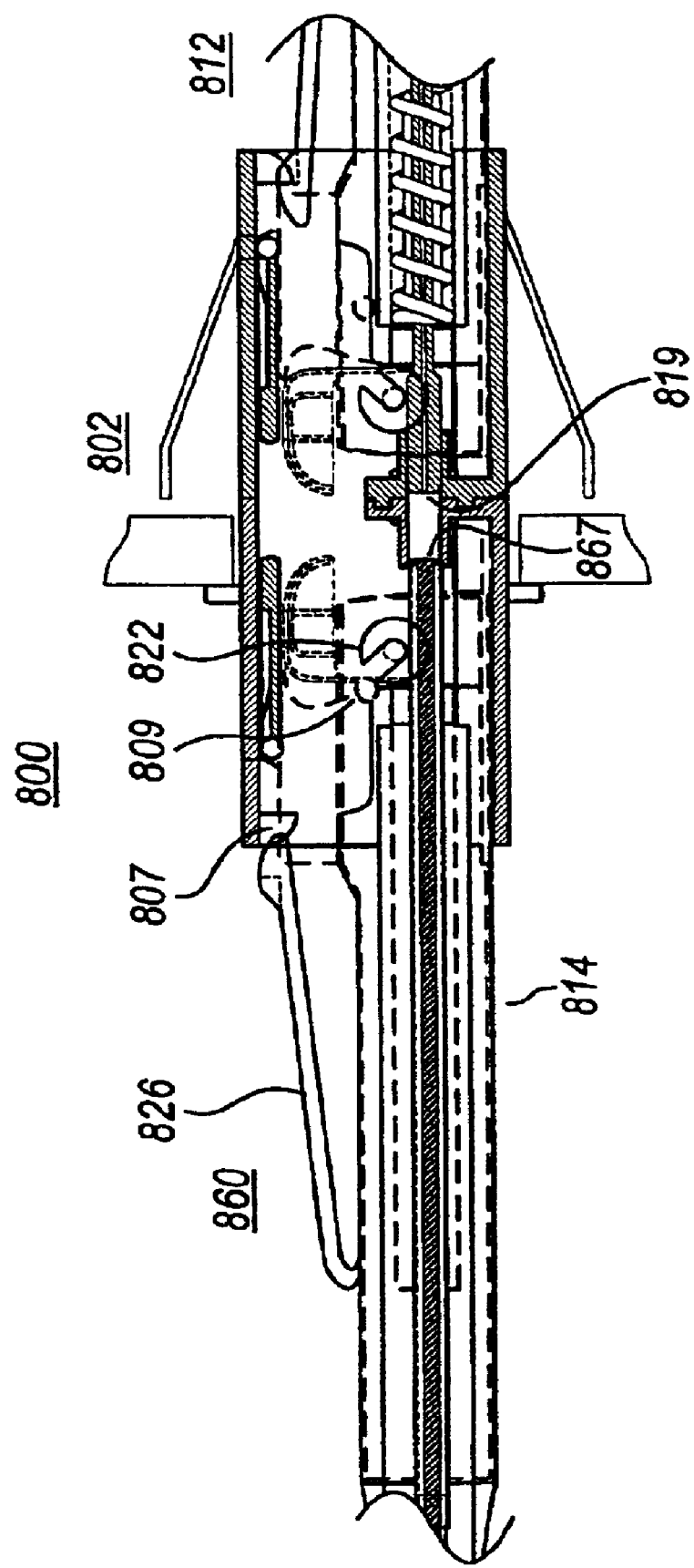

With respect to FIG. 8E, notice that cam pin 809 has completely traversed the extent of external connector shutter cam 822, thereby completely opening the shutter 820. In the depicted position, BOPA 860 has not completely engaged LX.5 adapter and protective sleeve 862 has been only partially accepted within ferrule tube 806. At this point the operator may be within the focal distance of the particular model of mini-borescope and able to view couple surface 819 or ferrule tube 806 for occlusions or scratches. However, the operator might instead continue inserting BOPA 860 into LX.5 adapter 802 for a closer view of the target surface. That notice that here the forward movement of depressible latch 826 will be impeded by combination latch cam and catch 807 on body 804. Therefore, in accordance with one exemplary embodiment of the present invention, depressible latch 826 is omitted from optical adapter 870 in order to allow the operator to readily change the field of view during inspection by reciprocating BOPA 860 forward and back from coupling surface 819.

The present invention alleviates the problems associated with troubleshooting opticals port for optical contamination. The present apparatus and process provides accurate diagnostic results thereby avoiding unnecessary board replacement by immediately identifying optical surface defects. As illustrated in the prior method of cleaning, measure power, "cleaning" is abbreviated using the present invention because occlusions and scratches that result in power loss are positively identified, and the outcome of subsequent cleaning attempts are likewise quantifiable. Additionally, the chance of retina damage due to accidental contact with power laser sources is greatly reduced because the target surface is not directly visualized, instead an image of the target surface is displayed. Finally, although the present invention has been described with respect to an optical transmission system, the present invention is equally suitable for inspecting other types of ports and connectors, such as electrical.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modification as are suited to the particular use contemplated.

What is claimed is:

1. A device for visually inspecting optical component comprising:
   a borescope, said borescope having a borescope insertion tube and an optical lens for viewing a target; and
   borescope insertion tube adapter for adapting the borescope insertion tube to an optical component to be inspected.

2. The device recited in claim 1 above, wherein the borescope insertion tube adapter further comprises:
   an adapter body, said adapter body being compatible for mating with the optical component to be inspected.

3. The device recited in claim 2 above, wherein the borescope insertion tube adapter secures the borescope insertion tube at a predetermined position within the adapter body.

4. The device recited in claim 2 above, wherein the predetermined position within the adapter body is within an effective focal distance for the borescope.

5. The device recited in claim 2 above, wherein the borescope insertion tube adapter further comprises:
   a protective sleeve disposed between said borescope insertion tube and said adapter body.

6. The device recited in claim 5 above, wherein the protective sleeve further comprises:
   a lock for securing the protective sleeve to the borescope insertion tube.

7. The device recited in claim 2 above, wherein the adapter body is one of SC, ST, FC, E2000, LC, LX, MU, MT component types.

8. The device recited in claim 2 above, wherein the adapter body cooperates with a shutter on the optical component to be inspected.

9. The device recited in claim 2 above, wherein the adapter body cooperates automatically actuating a shutter on the optical component to be inspected simultaneously during insertion to said optical component to be inspected.

10. The device recited in claim 2 above, wherein the borescope further comprises:
    a video camera for capturing images of a target on the optical component to be inspected.

11. The device recited in claim 6 above, wherein the borescope further comprises:
    a video camera for capturing images of a target on the optical component to be inspected.

12. The device recited in claim 2 above, wherein the borescope further comprises:
    a light emitter for illuminating a target on the optical component to be inspected.

13. The device recited in claim 11 above, wherein the borescope further comprises:
    a monitor for displaying images of the target on the optical component to be inspected.

14. The device recited in claim 2 above, wherein the adapter body is configured such that said borescope insertion tube adapter is maneuverable while mated with the optical component to be inspected, whereby the position of the optical lens is adjustable.

15. The device recited in claim 2 above, wherein the optical component to be inspected is one of a MU, MT, LC and LX type configured on a high density optical port.

16. The device recited in claim 2 above, the adapter body having an exterior body dimension and the optical component to be inspected having an interior component dimension, wherein an annular space is formed between the adapter body and the optical component, a magnitude of said annular space being approximately equivalent to the difference between the exterior body dimension and the interior component dimension.

17. The device recited in claim 16 above, the magnitude of said annular space being sufficient for manipulating the adapter body within the optical component, thereby redirecting a viewing axis onto multiple targets.

18. The device recited in claim 17 above, wherein the optical component is a matrix adapter and the target portion and the second target portion are first and second optical fibers in a plurality of optical fibers connected to said matrix adapter.

19. A method for implementing a borescope for visually inspecting optical component, said borescope having a borescope insertion tube coupled to an adapter body and an optical lens received therein, said optical lens for viewing a target portion on an optical component comprising:

engaging the adapter body to the optical component with the target portion to be inspected; and visualizing the target portion of said optical component through said borescope.

20. The method recited in claim 19 above, wherein engaging the borescope insertion tube adapter to the optical component further comprises coupling the borescope insertion tube adapter to the optical component.

21. The method recited in claim 20 above, wherein prior to inserting the borescope insertion tube adapter into the optical component, the method further comprises:

securing the adapter body to the borescope insertion tube at a predetermined position within the adapter body; and securing the borescope insertion tube at a predetermined position within the adapter body.

22. The method recited in claim 20 above, wherein the predetermined position within the adapter body is within an effective focal distance for the borescope.

23. The method recited in claim 20 above further comprises:

disposing a protective sleeve between said borescope insertion tube and said adapter body.

24. The method recited in claim 23 above further comprises:

locking the protective sleeve to the borescope insertion tube.

25. The method recited in claim 20 above, wherein the adapter body is one of SC, ST, FC, E2000, LC, LX, MU, MT component types.

26. The method recited in claim 20 above, wherein coupling the borescope insertion tube adapter to the optical component further comprises:

operating a shutter on the optical component to be inspected.

27. The method recited in claim 26 above, wherein operating a shutter on the optical component to be inspected further comprises:

actuating a shutter on the optical component to be inspected simultaneously during insertion to said optical component to be inspected.

28. The method recited in claim 20 above further comprises:

capturing images of the target portion of said optical component to be inspected.

29. The method recited in claim 24 above, wherein the borescope further comprises:

a video camera for capturing images of a target on the optical component to be inspected.

30. The device recited in claim 20 above further comprises:

illuminating the target portion of said optical component to be inspected.

31. The method recited in claim 29 above further comprises:

viewing an image of the target portion of the optical component to be inspected.

32. The method recited in claim 20 further comprises:

maneuvering the adapter body while engaged with the optical component to be inspected.

33. The method recited in claim 20 above, wherein the optical component to be inspected is one of a MU, MT, LC and LX type configured on a high density optical port.

34. The method recited in claim 19 above, the adapter body having an exterior body dimension and the optical component to be inspected having an interior component dimension, wherein an annular space is formed between the adapter body and the optical component, a magnitude of said annular space being approximately equivalent to the difference between the exterior body dimension and the interior component dimension, the method further comprising:

visualizing a second target portion by manipulating the adapter body within the optical component, thereby redirecting a viewing axis onto the second target portion.

35. The method recited in claim 34 above, wherein the optical component is a matrix adapter and the target portion and the second target portion are first and second optical fibers in a plurality of optical fibers connected to said matrix adapter.

* * * * *